United States Patent [19]

Mizrahi et al.

[11] 4,091,243
[45] May 23, 1978

[54] MULTIFREQUENCY SIGNAL RECEIVER

[75] Inventors: Albert Mizrahi, Tinton Falls; Neal John Moyer, Red Bank; David August Pezzutti, Lincroft, all of N.J.

[73] Assignee: Bell Telephone Laboratories, Incorporated, Murray Hill, N.J.

[21] Appl. No.: 819,112

[22] Filed: Jul. 26, 1977

[51] Int. Cl.$^2$ ............................................. H04M 1/50
[52] U.S. Cl. ................................................ 179/84 VF
[58] Field of Search .................... 179/84 VF; 328/138, 328/139, 140

[56] References Cited
U.S. PATENT DOCUMENTS 4,016,370  4/1977  Laoteppitaks et al. ......... 179/84 VF Primary Examiner—Kathleen H. Claffy
Assistant Examiner—Joseph A. Popek
Attorney, Agent, or Firm—Thomas Stafford

[57] ABSTRACT

Detection of valid two-out of-N multifrequency signals is realized by employing a microprocessor in conjunction with a controllably adjustable or settable reference threshold level and a plurality of threshold detectors. Under control of the processor, a reference threshold level supplied to the detectors is set to a first prescribed level. Upon detection of a tone which exceeds the first threshold level the processor controllably sets the reference threshold level to a second prescribed level. Detection of two, and only two, tones which are present for at least a minimum prescribed interval are then considered valid.

9 Claims, 4 Drawing Figures

MULTIFREQUENCY SIGNAL RECEIVER

BACKGROUND OF THE INVENTION

This invenion relates to signaling systems and, more particularly, to multifrequency signaling receivers.

Multifrequency signaling is now commonplace in communications systems. It is employed in subscriber signaling, signaling between central offices, interoffice communications, remote control of other systems, inputting data to computer systems, and the like. Consequently, it is increasingly important that detection of valid multifrequency signals be achieved accurately and inexpensively.

Heretofore, numerous arrangements have been proposed for detecting reception of "valid" multifrequency signals. A valid multifrequency signal is one which meets the established telecommunications objective of (a) two, and only two, tones being present for a prescribed interval, (b) one of the tones must have a magnitude greater than a first prescribed threshold level, for example greater than −5 dB relative to the single tone center of band output from the receiver automatic gain control (AGC) stage for the frequency of the particular multifrequency tone and, then, (c) another received tone is considered valid if it has a magnitude greater than a second prescribed threshold level, for example, greater than −10 dB relative to the single tone center of band output from the receiver AGC at the frequency of that tone. The −10 dB threshold corresponds to a tone having 6 dB of twist relative to the other received tone and being at the edge of the filter band for that particular tone.

Prior multifrequency receiver arrangements approximate the multifrequency reception objectives. In general, the prior known receiver arrangements are inefficient and somewhat cumbersome. They typically monitor two sets of circuit points simultaneously; one set of circuit points to determine if at least two tones have been received which exceed the second prescribed threshold of −10 dB, and the other set of circuit points to determine if the sum of the tones exceeds the first prescribed threshold of −5 dB. Since two separate sets of circuit points are being monitored simultaneously, additional hardware is required. Additionally, the monitoring arrangement for detecting whether the first threshold level has been exceeded typically employs a nonlinear summing arrangement which may be susceptible to noise signals and the like, thus yielding false indications of reception of "valid" multifrequency tones.

SUMMARY OF THE INVENTION

These and other problems of prior known multifrequency receivers are overcome in accordance with the principles of the invention to be described herein by employing a control circuit in conjunction with a controllably adjustable or settable reference threshold level and a plurality of threshold detectors to monitor received signal outputs from a plurality of bandpass filters. The reference threshold level supplied to the detectors is controllably adjusted in order to effect the telecommunications multifrequency detection objectives stated above.

That is to say, upon initialization of the multifrequency receiver, including an embodiment of the present invention, the reference threshold level supplied to the detectors is first set by the control circuit to a first prescribed threshold level, for example, −5 dB relative to a prescribed reference level. Upon detection of a tone at one of the desired frequencies having a magnitude which exceeds the first prescribed reference threshold level, the control circuit sets the reference threshold level supplied to the detectors to a second prescribed level lower than the first, for example −10 dB relative to a prescribed reference level. Thereater, a routine is effected to determine whether two, and only two, tones have been received and have been present for a prescribed interval. Thus, the control circuit controllably sets the reference threshold level supplied to the detectors and evaluates the detector outputs to determine whether the received tones meet the prescribed criteria for a valid multifrequency signal.

In effect, the control circuit in conjunction with the controllably adjustable or settable reference threshold level and the plurality of threshold detectors employs time multiplexed sampling of the outputs from the detectors to detect received signals which exceed the prescribed reference threshold levels and meet the prescribed interval criteria for a valid multifrequency signal.

BRIEF DESCRIPTION OF THE DRAWINGS

These and other objects and advantages of the invention will be more fully understood from the following detailed description of an illustrative embodiment thereof taken in connection with the appended drawings, in which.

DETAILED DESCRIPTION

Figure 1:
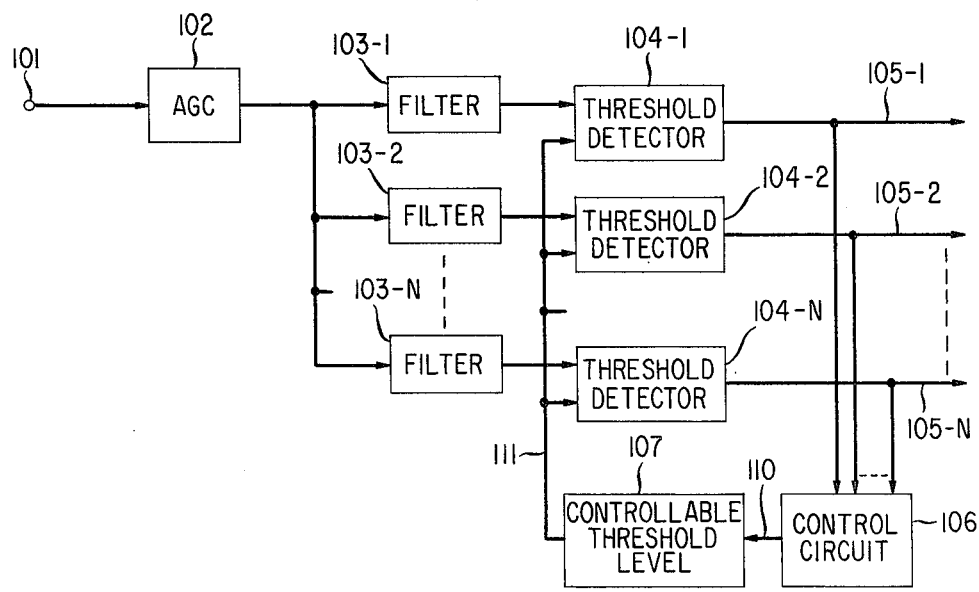
FIG. 1 shows in block schematic form an arrangement in accordance with the invention for receiving multifrequency signals.

FIG. 1 illustrates in simplified block diagram form one embodiment of the instant invention for detecting reception of a valid multifrequency signal. The embodiment shown may be employed as desired for detecting two-out of-N multifrequency tones. It is noted that two-out of-six multifrequency tone receivers have become widely used in telecommunications systems. Accordingly, received signals are supplied via input terminal 101 and automatic gain control (AGC) circuit 102 to inputs of filters 103-1 through 103-N.

AGC 102 is employed to maintain the input level to filters 103-1 through 103-N within prescribed limits for variations in the input signal supplied to terminal 101. For example, the output from AGC 102 may vary 1.4 dBm for input signal variations of from zero to −27 dBm. Automatic gain control circuit arrangements known in the art are capable of meeting these requirements. A so-called variolosser automatic gain control arrangement employing a variable resistance pad effected by applying a direct current control signal to diodes shunting a balanced input is preferably used for this purpose. One such variolosser automatic gain control circuit is shown in U.S. Pat. No. 3,539,731, issued Nov. 10, 1970. However, it is noted that the circuit functions disclosed in this prior automatic gain control circuit are realized by employing discrete component circuit arrangements. In the instant embodiment, operational amplifier circuit arrangements are preferably employed to effect those circuit functions.

Filters 103-1 through 103-N are bandpass filters each capable of passing a distinct frequency tone employed in telecommunications multifrequency signaling. Preferably, they each include two biquadratic active resistor-capacitor filters connected in cascade to realize the bandpass function. An example of one such active filter is generally described in U.S. Pat. No. 3,919,658, issued to J. J. Friend on Nov. 11, 1975.

Outputs from filters 103-1 through 103-N are supplied on a one-to-one basis to a first input of threshold detectors 104-1 through 104-N, respectively. In turn, outputs 105-1 through 105-N of detectors 104-1 through 104-N, respectively, are direct current representations of the individual frequency components of received multifrequency tones and may be utilized as desired.

Each of detectors 104-1 through 104-N includes a comparator circuit (not shown) having first and second inputs and an output. In an example from experimental practice, a differential amplifier of the so-called operational type is employed in conjunction with a monostable multivibrator (not shown) to yield the desired comparison and direct current output when an input exceeds prescribed threshold levels supplied to a second input of each of detectors 104. The unstable interval of the individual monostable multivibrators is set at an interval substantially equal to but slightly greater than the period of the corresponding frequency being detected. Thus, each of detectors 104 is essentially an analog-to-digital converter which reinitializes itself. That is to say, produces a logical true output while the input signal is present so that control circuit 106 can detect its presence.

Outputs 105-1 through 105-N are also supplied to control circuit 106. Control circuit 106 is a so-called microcomputer which is pre-programmed to generate signals for controlling controllable threshold level circuit 107 and for evaluating signals developed at outputs 105 to determine whether received signals are valid multifrequency commands.

A control signal is supplied from control circuit 106 via circuit path 110 to adjust or set the reference threshold level output from circuit 107 in accordance with prescribed criteria. The reference threshold level output from circuit 107 is supplied via circuit path 111 to the second input of each of dectecors 104.

Figure 2:
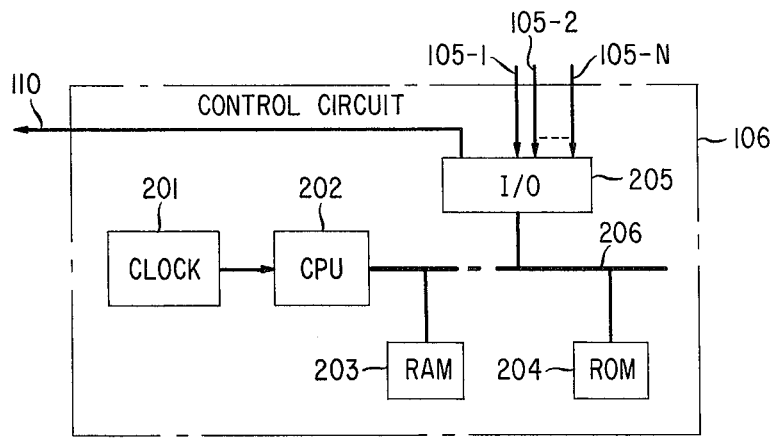
FIG. 2 shows in block schematic form details of the control circuit employed in the embodiment of the invention shown in FIG. 1.

FIG. 2 shows in simplified block diagram form details of control circuit 106. Accordingly, shown are clock circuit 201, central processor unit (CPU) 202, read-write memory commonly referred to as random access memory (RAM) 203, read-only memory (ROM) 204, and input/output (I/O) 205. CPU 202, RAM 203, ROM 204 and I/O 205 are interconnected via bus 206 to form a so-called microcomputer system. Clock 201 supplies timing signals for CPU 202. Any of several arrangements now commercially available may be employed to realize the desired implementation of control circuit 106. In an example from experimental practice, an Intel 8080A CPU and compatible associated circuit elements have been employed. The 8080A and its operation and programming is described in "Intel 8080 Microcomputer Systems User's Manual", September 1975. It should also be noted that arrangements including the desired configuration packaged as a single unit are now becoming available, for example, the Intel 8741 or the like.

CPU 202 includes a plurality of working registers, four of which are employed in the practice of the invention, namely, A, C, D and E. The multifrequency detection routine to be described below is stored in ROM 204.

Figure 3:
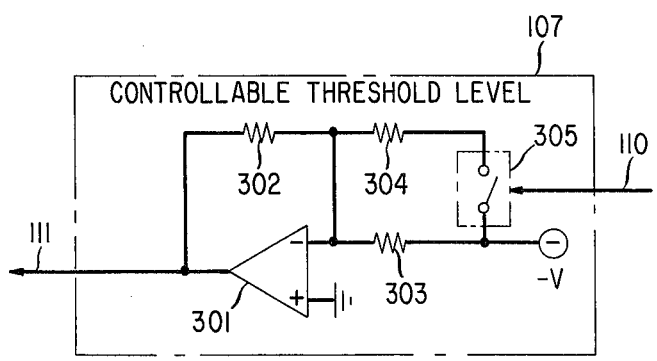
FIG. 3 shows details of the controllable threshold level circuit utilized in the embodiment of the invention shown in FIG. 1.

Details of controllable threshold level circuit 107 are shown in FIG. 3. Accordingly, shown are differential amplifier 301, feedback resistor 302, level setting resistors 303 and 304, controllable switch 305, and reference voltage source $-V$. Amplifier 301 is of the high gain type commonly referred to as an operational amplifier and is configured in conjunction with resistors 301, 302, 303 and 304 as an inverting amplifier. With switch 305 in the open position, the gain of the inverting amplifier is determined by resistors 302 and 303, and a potential level is developed at 111 corrresponding to $-10$ dB from a given reference level. With switch 305 in the closed position, the gain of the inverting amplifier is increased since resistor 304 is connected in parallel with resistor 303 and a potential level is developed at 111 corresponding to $-5$ dB from the given reference level. As indicated above, the given reference is the single tone center of band output from AGC 102 (FIG. 1).

Operation of control circuit 106 in controlling controllable threshold level circuit 107 and signals developed at outputs 105-1 through 105-N, in accordance with the invention, is described in the digital program listing shown in the Appendix. This program listing, written in assembly language for the Intel 8080A, is a description of the set of electrical control signals that serve to reconfigure control circuit 106 into a machine capable of controlling the multifrequency receiver of FIG. 1 for detecting reception, in accordance with the invention, of valid multifrequency commands.

Figure 4:
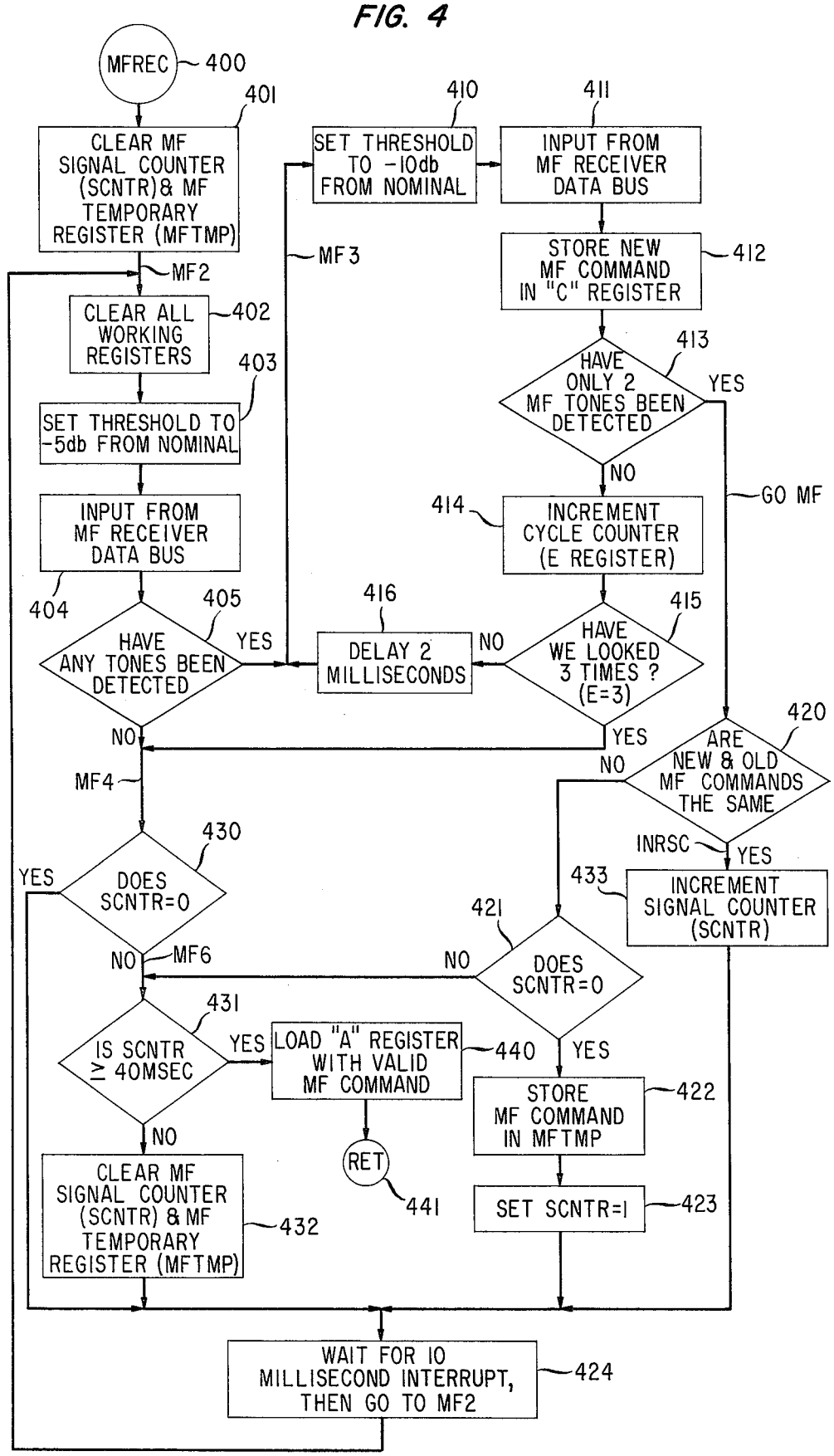
FIG. 4 is a flowchart which illustrates the sequence of steps in accordance with the invention for detecting reception of valid multifrequency signals utilizing the embodiment of the invention shown in FIG. 1.

The program listing and, hence, operation of the multifrequency receiver, in accordance with the invention, is more readily understood with the aid of the flowchart shown in FIG. 4. The flowchart can be seen to include three different symbols. The circular symbols indicate and signify the beginning the end of the routine. The rectangular symbols, commonly referred to as operational blocks, contain the description of a particular detailed operational step. The diamond shaped symbols, commonly referred to as conditional branch points, contain a description of a test performed by the microcomputer for enabling it to determine the next operation to be performed.

As shown in the flowchart of FIG. 4, the multifrequency (MF) receive (MFREC) routine is entered at circle 400. Operational block 401 indicates that control circuit 106 (FIG. 1) is to be initialized by clearing the MF signal counter (SCNTR) and the MF temporary register (MFTMP) which are both in RAM 203 (FIG. 2). This occurs when the main program of the microcomputer is left to enter the MFREC subroutine.

Operational block 402 (FIG. 4) indicates that all the working registers, namely A, C, D and E, of CPU 202 are cleared.

Operational block 403 indcates that controllable threshold level circuit 107 is set to yield a first prescribed reference threshold level corresponding to $-5$ dB from nominal, i.e., from the given reference level.

Operational block 404 indicates sampling of the inputs from the MF receiver data bus, i.e., sampling of signals developed at outputs 105-1 through 105-N (FIG. 1).

Branch point 405 tests to determine whether any tones are present on the receiver data bus. The NO test result is discussed below. If one or more tones are present control is transferred to operational block 410, i.e., MF3.

Block 410 causes a control signal to be generated which is supplied via 110 (FIG. 1) to controllable threshold level circuit 107 and causes switch 305 (FIG. 3) to be opened. Consequently, controllable threshold level circuit 107 yields a second prescribed reference threshold level at 111 (FIG. 1) which is representative of a −10 dB level from nominal, i.e., from the given reference level. Consequently, threshold detectors 104-1 through 104-N will yield an output for the signals from filters 103-1 through 103-N, respectively, having a magnitude greater than this lower −10 dB threshold level. Control is transferred to operational block 411.

Block 411 causes signals developed at outputs 105-1 through 105-N of threshold detectors 104-1 through 104-N (FIG. 1), respectively, to be sampled. Control is transferred to operational block 412.

Block 412 causes the received multifrequency (MF) command to be stored in register C of CPU 202 (FIG. 2). Control is transferred to conditional branch point 413.

Branch point 413 tests to determine if only two MF tones have been detected. The number of tones detected is stored in register D of CPU 202. The condition of only two tones being detected is discussed below. If less than or more than two tones are detected the test result is NO and control is transferred to operational block 414. The condition causing a test result of NC can result from noise transients or the like on the transmission line. Thus, it is desirable to filter the signal, i.e., let it settle. This filtering or settling is effected by employing a delay loop.

Thus, block 414 increments a cycle counter, i.e., register E of CPU 202 (FIG. 2). Then, control is transferred to conditional branch point 415.

Branch point 415 tests to determine if the condition of less than two or more than two tones being detected has been checked 3 times. The YES result is discussed below. If the result is NO then control is transferred to operational block 416.

Block 416 inserts a delay of two (2) milliseconds (ms) into the filtering or settling time loop. Since we have chosen to test the condition of less than or more than two tones being presented three times, the total delay is 6 ms. This delay interval is sufficient for the transmission line to settle after a change in condition or some other transient, for example, switching from one MF command to another.

Returning now to branch point 413, if only two tones have been detected control is transferred to conditional branch point 420. Branch point 420 tests whether the presently detected tones are the same as the previously detected tones. Since this is the first time through the detection routine the test result is NO. The YES result is discussed below. Consequently, control is transferred to conditional branch point 421.

Branch point 421 tests to determine whether the count in the MF signal counter (SCNTR) is zero (0). Again, since this is the first time through the routine the test result is YES. The NO test result is discussed below. Control is transferred to operational block 422.

Block 422 causes the presently detected MF command to be stored in the MF temporary register (MFTMP) of RAM 203 (FIG. 2). Control is transferred to operational block 423.

Block 423 causes SCNTR in RAM 203 (FIG. 2) to be set to one (1). Control is transferred to block 424.

Block 424 inserts a delay of approximately 10 ms before another detection cycle is initiated by causing the routine to wait for the 10 ms interrupt. Thereafter, control is returned to operational block 402, i.e., to the point labeled "MF2".

The detection routine is reinitiated and operation of blocks 402, 403 and 404 is as described above. However, let us now assume that the test performed by branch point 405 yields a NO result, i.e., no tones have been detected. Control is then transferred to conditional branch point 430, MF4.

Branch point 430 tests to determine whether or not a count in SCNTR is zero (0). If the result is YES it means that no tones have as yet been received and control is transferred to operational block 424 and the detection routine is again reinitiated. Since SCNTR is one (1) the test result is NO and control is transferred to conditional branch point 431, MF6.

Branch point 431 tests to determine whether the count in SCNTR is representative of an interval equal to or greater than 40 ms, i.e., a count of four or more. For a MF command to be valid, it must be present for at least 40 ms. The YES result is discussed below. Again, since the count in SCNTR is one (1), the result is NO and control is transferred to operational block 432.

Now since no tones have been detected and the count in SCNTR indicates that the previously detected tones were not present for the minimum interval of 40 ms, the originally detected tones are considered not valid. Consequently, block 432 clears both SCNTR and MFTMP in RAM 203 (FIG. 2). Thereafter, control is transferred to operational block 424 and the detection routine is reinitiated by returning to operational block 402, i.e., point MF2.

Let us now return to conditional branch point 405 and assume that one or more tones are again detected. Control is then transferred to operational block 410 and operation of blocks 410, 411 and 412, branch point 413, block 414, branch point 415 and block 416 are as discussed above. However, let us assume that the test result of branch point 415 is YES. That is to say, presently detected tones have been examined during this detection cycle three times and that either less than or more than two tones have been detected. Thereafter, control is transferred to conditional branch point 430.

Operation of branch points 430 and 431 and operational block 432 are as discussed above.

Returning now to conditional branch point 413, let us assume that only two tones have been detected and, consequently, the test result is YES. Control is again transferred to conditional branch point 420.

Since the presently detected tones are assumed to be the same as the previously detected tones, the test result of branch point 420 is YES and control is transferred to operational block 433, point INRSC.

Block 433 causes SCNTR to be incremented. Since this is the second time through the routine SCNTR is set to two (2). Control is thereafter transferred to operational block 424 and the detection routine is again initiated at MF2.

Let us assume that the detection routine proceeds as discussed above to conditional branch point 420, i.e., to GOMF, and at this point the presently detected tones are not the same as the previously detected tones thereby yielding a NO test result. Control is transferred to conditional branch point 421.

Since the count in SCNTR is now two (2) the test result of branch point 421 is NO and control is transferred to conditional branch point 431.

Branch point 431 tests the count in SCNTR to determine whether or not the tones were present for 40 ms or not. Since the count is two (2) the result is NO and control is transferred to operational block 432.

Operation of blocks 432 and 424 is as discussed above and the detection routine is again reinitiated.

Let us now assume that the presently detected MF tones have been present for at least four (4) cycles of the detection routine, i.e., for at least 40 ms. Several conditions can occur which cause a determination that a valid MF command has been received. One condition is that no MF tones are now present; another condition is that a transient condition exists and subsists for at least 6 ms; and another condition is that presently detected MF tones are different from the previously detected MF tones.

Thus, assuming that at least 4 cycles of the routine have been completed, i.e., SCNTR equals four or more and no tones are presently detected, the routine proceeds to branch point 405 which yields a NO result. Control is transferred to branch point 430 which yields a NO result because SCNTR is greater than zero. Control is transferred to branch point 431 which yields a YES result because SCNTR is four (4) or more. In turn, control is transferred to operational block 440 which causes register A of CPU 202 (FIG. 2) to be loaded with the detected valid MF command. Thereafter, the MFREC routine is exited via 441 and control is returned to the main program.

When a noise or transient condition subsists for at least 6 ms the test of branch point 415 yields a YES result and control is transferred to branch point 430. Since 4 cycles of the detection routine have been completed the operation of branch points 430 and 431 and operational block 440 are as discussed above for reception of a valid command. Again, the MFREC routine is exited via 441 as discussed above.

Under the condition that the presently detected MF tones are different from the previously detected MF tones, branch point 420 yields a NO result and control is transferred to branch point 421. Since four (4) cycles of the detection routine have been completed, branch point 421 also yields a NO result and control is transferred to branch point 431. Operation of branch point 431, operational block 440 and exit 441 are discussed above for detection of a valid MF command.

In summary, the MF reception routine of this embodiment of the invention is (a) set the reference level supplied to detectors 104 (FIG. 1) to a first prescribed level, for example, −5 dB from nominal, and determine if a tone is present at one of outputs 105; if so (b) set reference level supplied to detectors 104 to a second prescribed level, for example, −10 dB from nominal, and determine whether two and only two tones are present for at least a minimum prescribed time interval, for example, 40 ms; if so, the received MF signal is a valid MF command and may be utilized as desired.

APPENDIX

```
MFREC:  XRA   A         ;A=0
        STA   SCNTR     ;SIGNAL COUNTER = 0
        STA   MFTMP     ;MFTMP = 0
MF2:    XRA   A         ;A=0 (WORKING REGISTER)
        MOV   C,A       ;C=0 (NEW MF BITS)
        MOV   D,A       ;D=0 (NUMBER OF DETECTED MF TONES)
        MOV   E,A       ;E=0 (CYCLES LOOKING FOR MF TONES)
        MVI   A,02
        CALL  SET1      ;SET -5DB THRESHOLD ON PORT 1
        IN    1         ;INPUT FROM PORT 1 DATA BUS
        ANA   3FH       ;MASK MF RECEIVER BITS
        JZ    MF4       ;NO MF TONES FOUND AT -5DB THRESHOLD
MF3:    MVI   A,01H
        CALL  CLR1      ;THRESHOLD SET TO -10DB ON PORT 1
        IN    1         ;INPUT FROM PORT 1 DATA BUS
        ANI   3FH       ;ISOLATE MF BITS
        MOV   C,A       ;C - NEW MF BITS
        RRC             ;CARRY HAS MF 7 BIT
        CC    ADD       ;INCREMENT D REGISTER IF MF 7 SET
        RRC             ;CARRY HAS MF 9 BIT
        CC    ADD       ;INCREMENT D REGISTER IF MF 9 SET
        RRC             ;CARRY HAS MF 11 BIT
        CC    ADD       ;INCREMENT D REGISTER IF MF 11 SET
        RRC             ;CARRY HAS MF 13 BIT
        CC    ADD       ;INCREMENT D REGISTER IF MF 13 SET
        RRC             ;CARRY HAS MF 15 BIT
        CC    ADD       ;INCREMENT D REGISTER IF MF 15 SET
        RRC             ;CARRY HAS MF 17 BIT
        CC    ADD       ;INCREMENT D REGISTER IF MF 17 SET
        MOV   A,D       ;LOAD D INTO A
        CPI   02H       ;HAVE ONLY 2 MF TONES BEEN RECEIVED
        JZ    GOMF      ;YES WE HAVE A VALID COMMAND
        INR   E         ;INCREMENT E REGISTER
        MOV   A,E       ;HAVE WE CHECKED FOR 2 MF'S 3 TIMES
        CPI   03H
        JNZ   MF3X      ;NO TEST AGAIN
MF4:    LDA   SCNTR     ;LOAD A REGISTER WITH SIGNAL COUNTER
        CPI   00H       ;DOES SIGNAL COUNTER = 0
        JZ    STOP      ;YES JUMP TO STOP
MF6:    LDA   SCNTR     ;LOAD A REGISTER WITH SIGNAL COUNTER
        CPI   04H       ;DOES SIGNAL COUNTER = 40 MILLISECONDS
        JNC   MF5       ;JUMP TO MF5 IF A > OR = 4
        XRA   A         ;A = 0
        STA   MFTMP     ;MFTMP = 0
        STA   SCNTR     ;SCNTR = 0
        JMP   STOP
GOMF:   LDA   MFTMP     ;LOAD A WITH MFTMP
        MOV   D,A       ;LOAD D WITH MFTMP
        MOV   A,C       ;LOAD A WITH NEW MF BITS
        CMP   D         ;DO NEW MF BITS - OLD MF BITS
        JZ    INRSC     ;YES JUMP TO INCREMENT SIGNAL COUNTER
        LDA   SCNTR     ;LOAD A WITH SIGNAL COUNTER
        CPI   00        ;IS THIS FIRST TIME AROUND
        JNZ   MF6       ;NO JMP TO MF6
        MOV   A,C       ;LOAD A WITH NEW MF TONE
        STA   MFTMP     ;MFTMP HAS NEW MF BITS
        MVI   A,01H     ;A=1
        STA   SCNTR     ;SIGNAL COUNTER = 1
        JMP   STOP
INRSC:  LDA   SCNTR     ;LOAD WITH A SIGNAL COUNTER
        INR   A         ;INCREMENT A REGISTER
        STA   SCNTR
        JMP   STOP
ADD:    INR   D         ;INCREMENT D REGISTER
        RET             ;RETURN TO MF=3 ROUTINE
MF3X:   CALL  D2MS      ;DELAY 2 MILLISECONDS
        JMP   MF3
MF5:    LDA   MFTMP     ;LOAD A WITH MFTMP
```

APPENDIX
-continued

RET

What is claimed is:

1. Apparatus for detecting reception of multifrequency signals of the type including a plurality of filters for passing individual multifrequency tones of a gain adjusted received signal, wherein the improvement comprises:
controllable threshold detector means in circuit relationship with the plurality of filters for generating output signals indicative of individual received multifrequency tones having amplitudes greater than prescribed threshold levels; and
control means for generating signals to control said controllable threshold detector means for detecting signals which have amplitudes greater than first and second prescribed reference threshold levels in accordance with prescribed criteria and for evaluating said controllable threshold detector means output signals to determine whether only two tones have been received for at least a prescribed minimum time interval.

2. The apparatus as defined in claim 1 wherein said control signal generating means generates a sequence of control signals used to control detection of a valid multifrequency signal by: first, controlling said controllable threshold detector means to yield output signals indicative of multifrequency tones which have amplitudes greater than a first prescribed reference threshold level; second, evaluating signals developed at outputs of said controllable threshold detector means to determine if a multifrequency tone has been received having an amplitude greater than said first prescribed reference threshold level; third, controlling said controllable threshold detector means to yield output signals indicative of multifrequency tones which have amplitudes greater than a second prescribed reference threshold level; fourth, evaluating signals developed at outputs of said controllable threshold detector means to determine if two, and only two, multifrequency tones have been received having amplitudes greater than said second prescribed reference threshold level; and fifth, evaluating said two received multifrequency tones to determine whether they are present for a prescribed minimum time interval.

3. Apparatus as defined in claim 1, wherein said controllable threshold detector means includes controllable threshold level generating means responsive to said signals from said control means for generating said first and second prescribed reference threshold levels and a plurality of threshold detector means, each having first and second inputs and an output, said first inputs being in one-to-one circuit relationship with the individual ones of the filters, said second inputs being in circuit relationship with said controllable threshold level generating means, and said outputs being in circuit relationship with said control means.

4. The apparatus as defined in claim 3, wherein said control means generates a sequence of control signals used to control detection of a valid multifrequency signal by: first, controlling said controllable threshold level generating means to generate a first prescribed reference threshold level; second, sampling signals developed at said outputs of said plurality of threshold detector means to determine if a multifrequency tone has been received having an amplitude greater than said first prescribed reference threshold level; third, controlling said controllable threshold level generating means to generate a second prescribed reference threshold level, said second prescribed reference threshold level being in a predetermined relationship to said first reference threshold level; fourth, sampling signals developed at said outputs of said plurality of threshold detector means to determine if two, and only two, multifrequency tones having an amplitude greater than said second prescribed reference threshold level have been received; fifth, determining whether the two, and only two, multifrequency tones have been received for at least a prescribed minimum time interval.

5. Apparatus as defined in claim 1, wherein said control means includes computer means.

6. Apparatus as defined in claim 5, wherein said computer means includes central processor means having a plurality of working registers, clock means for supplying timing signals to said central processor means, read/write memory means having at least first and second registers, read-only memory means, and input/output means.

7. Apparatus as defined in claim 6, wherein said controllable threshold detector means includes controllable threshold level generating means responsive to said signals from said control means for generating said first and second prescribed reference threshold levels and a plurality of threshold detector means, each having first and second inputs and an output, said first inputs being in one-to-one circuit relationship with the individual ones of the filters, said second inputs being in circuit relationship with said controllable threshold level generating means, and said outputs being in circuit relationship with said control means.

8. Apparatus as defined in claim 7, wherein a set of instructions are stored in said read-only memory means for causing said control means to effect detection of a valid multifrequency signal by: first, controlling said controllable threshold level generating means to generate a first prescribed reference threshold level; second, evaluating signals developed at said outputs of said plurality of threshold detector means to determine if a multifrequency tone has been received having an amplitude greater than said first prescribed reference threshold level; third, controlling said controllable threshold level generating means to generate a second prescribed reference threshold level; fourth, evaluating signals developed at said outputs of said plurality of threshold detector means to determine if two, and only two, multifrequency tones have been received having amplitudes greater than said second prescribed reference threshold level; and fifth, evaluating said two received multifrequency tones to determine whether they are present for a prescribed minimum time interval.

9. Apparatus as defined in claim 7, wherein a set of instructions are stored in said read-only memory means for causing said computer means to effect detection of a valid multifrequency signal by: first, initializing the receiver; second, clearing said working registers of said central processor unit; third, generating a control signal to set said controllable threshold level generating means to yield a first prescribed threshold level; fourth, sampling signals developed at the outputs of said threshold detector means; fifth, test outputs from said threshold detector means to determine if any multifrequency tones have been received; sixth, if test in step fifth is NO go to step seventh; seventh, test whether count in a first register of said read/write memory means is zero; eighth, if test in step seventh is YES proceed to step ninth; ninth, wait for prescribed time interval interrupt of central processor unit and return to step seventh; tenth, if test in step seventh is NO go to step eleventh; eleventh, test count in said first read/write memory means register to determine if equal to or greater than a predetermined number; twelfth, if test in step eleventh is NO clear said first read/write memory means register and a second register of said read/write memory means and return to step ninth; thirteenth, if test in step eleventh is YES load a first one of said working registers with the received valid multifrequency command; fourteenth, exit multifrequency receive routine; fifteenth, if test in step fifth is YES go to step sixteenth; sixteenth, generate a control signal to set controllable threshold level generating means to yield a second prescribed reference level; seventeenth, sample signals developed at the outputs of said threshold detector means; eighteenth, store presently detected multifrequency command in a second of said working registers; nineteenth, test to determine whether presently detected multifrequency command includes only two multifrequency tones; twentieth, if test in step nineteenth is NO increment count in a third one of said working registers; twenty-first, test count in said third working register to determine if equal to a prescribed number; twenty-second, if test in step twenty-first is NO insert delay for a prescribed interval and return to step sixteenth; twenty-third, if test in step twenty-first is YES go to step eleventh; twenty-fourth, if test in step nineteenth is YES go to step twenty-fifth; twenty-fifth, test whether presently detected multifrequency command is same as last detected multifrequency command; twenty-sixth, if test in step twenty-fifth is NO test if count in said first read/write memory means register is zero; twenty-seventh, if test in step twenty-sixth is NO go to step eleventh; twenty-eighth, if test in step twenty-fifth is YES store the presently detected multifrequency command in said second read/write memory means register, set count in said first read/write memory means register to one (1) and go to step ninth; twenty-ninth, if test in step twenty-fifth is YES increment count in said first read/write memory means register and to step ninth.

* * * * *